Aug. 6, 1935. J. N. ICE 2,010,489
TORQUE SHOCK ABSORBER
Filed Sept. 5, 1934
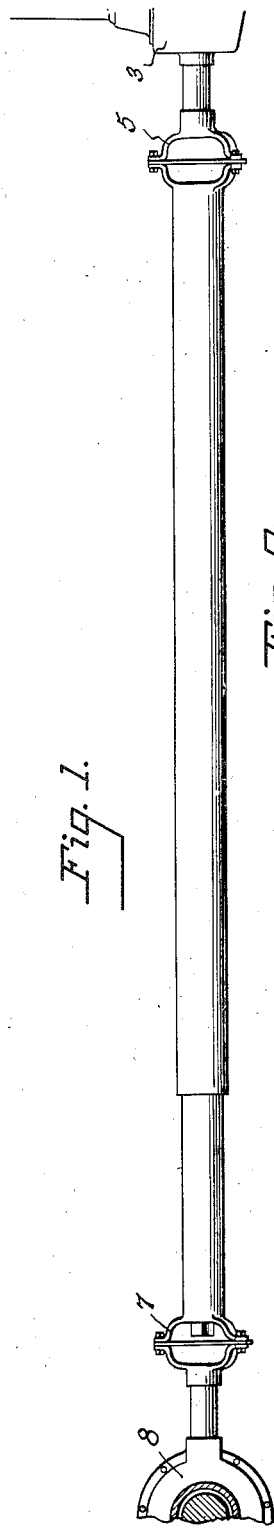
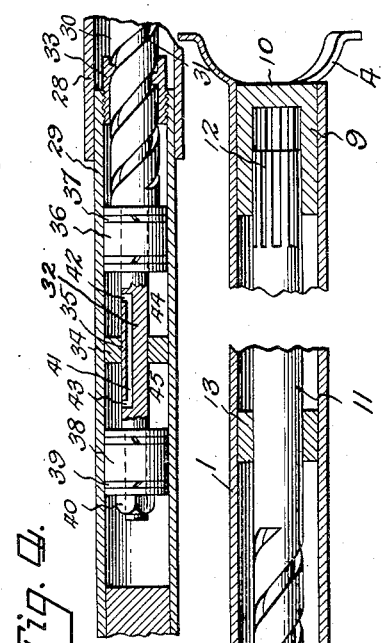
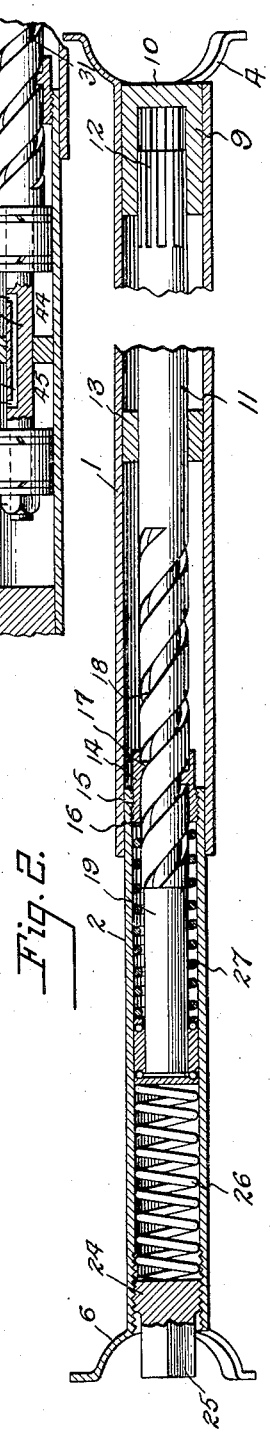
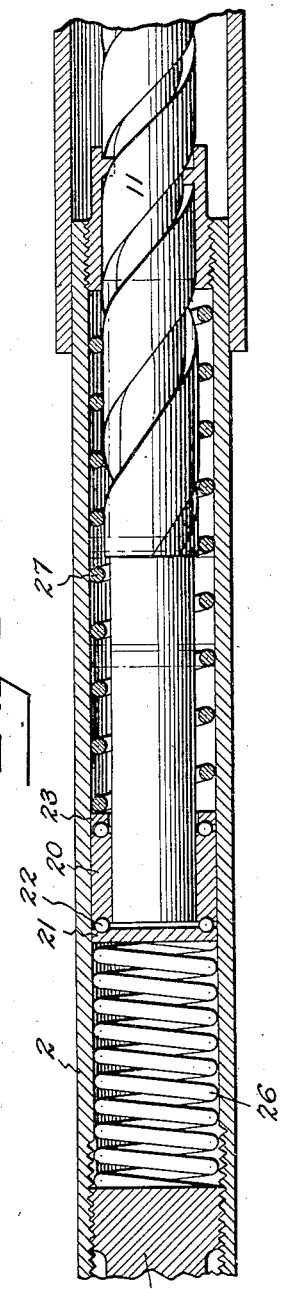
Inventor
James N. Ice
By
Attorney Patented Aug. 6, 1935

2,010,489

UNITED STATES PATENT OFFICE 2,010,489

TORQUE SHOCK ABSORBER

James N. Ice, Wheeling, W. Va., assignor to Samuel O. Paull, Wellsburg, W. Va.

Application September 5, 1934, Serial No. 742,849

6 Claims. (Cl. 64—100)

This invention is directed to an improvement in torque shock absorbers designed particularly for use in connection with the drive shaft of motor vehicles.

In motor vehicles, the torque stress of the drive shaft in initially taking up the load of the vehicle in starting has a decided tendency to induce a whipping action of the shaft which is obviously objectionable and the same condition applies more or less when the rear wheels of the vehicle are over-running the engine as in those instances where the vehicle is traveling down a hill.

It is an object of the present invention to so construct the drive shaft that the load of the vehicle, either in initial starting or over-running, is gradually taken up by the shaft to thereby avoid a sudden torque stress and a consequent tendency to whipping.

More specifically considered, the drive shaft is made up of sections adapted for relative longitudinal movement under any undue torque stress on the rod or the shaft, with such longitudinal movement gradually and increasingly resisted until reaching a point where the resistance to longitudinal movement overcomes the load resistance, whereupon the shaft moves as a unit for driving purposes.

The invention is illustrated in the accompanying drawing, in which:

Figure 1 is a view in elevation of the improved drive shaft, parts of the transmission and differential being shown.

Figure 2 is a longitudinal sectional view, partly in elevation, of the drive shaft proper.

Figure 3 is an enlarged view of the drive shaft, the same being shown in longitudinal section with parts broken away.

Figure 4 is a broken longitudinal sectional view of a modified form.

The improved drive shaft comprises the sleeve 1 forming the transmission end of the shaft and a second sleeve 2 fitted within the end of the sleeve 1 and forming the differential end of the drive shaft. The end of the sleeve 1 next the transmission 3 is integrally formed at 4 with parts constituting any preferred type of universal 5 adjacent the transmission. The end of the sleeve 2 is similarly formed with integral universal parts 6 forming part of the universal 7 next the differential 8.

The sleeve 1 is provided immediately adjacent its universal connection with an interior hollow driving element 9, the end of which next the universal is closed at 10, with such driving element permanently secured in any appropriate manner within the sleeve. A solid shaft 11 forms part of the drive shaft, the end next the transmission having a broach-and-spline connection 12 with the interior of the driving member 9, whereby the solid shaft is capable of relative longitudinal movement with respect to the driving member but held against independent rotary movement. The solid shaft 11 is further guided and supported within the sleeve 1 by a bearing support 13.

A nut 14 is secured in the end of the sleeve 2 remote from the differential, such nut being threaded into the end of the sleeve 2, as at 15, and then welded or otherwise rigidly secured against turning, as at 16. The nut is interiorly provided with a rib 17 shaped and formed to cooperate with an elongated thread-like channel 18 formed in the solid shaft 11. Thus, under differential rotation of the shaft 11 and sleeve 2, the nut will obviously compel a longitudinal movement of the solid shaft 11.

The solid shaft 11 is extended beyond the threaded portion, and preferably diametrically reduced, as at 19. This end of the solid shaft extends within the sleeve 2 and is terminally provided with an enlargement or plunger 20, the end of which is provided immediately beyond the end of the shaft with a disk 21 having anti-friction bearing contact at 22 with the end of the plunger and constituting a thrust bearing, a similar thrust bearing 23 being arranged at the opposite end of the plunger and encircling the shaft 11.

The end of the sleeve 2 next the universal is provided with a plug 24 threaded into the sleeve and designed for longitudinal adjustment therein, the plug having a non-circular projection 25 which extends beyond the proximate end of the sleeve 2 for convenient application of a tool for adjusting the plug. A spring 26 is arranged within the sleeve 2 between the thrust bearing 21 and the plug 24, a second spring 27 encircling the solid shaft 11 between the thrust bearing 23 and the nut 14.

From the above construction, it will be apparent that in the initial drive in the engine, the sleeve 1, driving member 9 and the solid shaft 11 are correspondingly driven, while under the load of the vehicle the sleeve 2 and nut 14 are being held more or less stationary. In the relative movement of the solid shaft 11 and the nut 14, a longitudinal movement is imparted to the shaft which obviously tends to compress the spring 26. This compression is continued and the resistance of the spring to the compression is gradually imparted to the sleeve 2, with a consequent gradual torque stress on said sleeve 2. As the movement of the shaft 11 continues, a point in the resistance to compression of the spring 26 will be reached which will overcome the torque resistance of the sleeve 2 to operating the rear wheels and so picking up the load. This point is reached gradually and finally the load is taken up and the vehicle is in motion, following which, under continued load resistance, the drive shaft will operate as a unit.

Under opposing driving conditions, where the load of the vehicle constitutes the power as when the vehicle is moving down a hill, the sleeve 2 will be operated by the load end of the vehicle at a greater speed than that of the solid shaft 11 which, of course, is driven by the engine. Under these conditions, the relative movement between the shaft 11 and nut 14 will be reversed and the solid shaft 11 will move toward the transmission assisted by the power of the spring 26, with the final result of compressing the spring 27 to gradually assume the torque stress and thus avoid the shock incident to the over-run of the load and its take-up by the engine.

Thus, in operating the drive shaft in either direction, that is under the power of the engine in initially picking up the load or in the over-run of the load and the transmission of the shock to the engine, the improved drive shaft will gradually absorb the torque stress and gradually cause the torque stress to overcome the power of resistance for normal operations. Thus, the drive shaft constitutes a torque shock absorber which very gradually transmits, through the torque of the shaft, the power to the load, thus gradually taking up the load and avoiding undue torque stress on the shaft with a consequent tendency to whipping.

In Figure 4 there is illustrated a modified form of the invention involving the use of sleeves 28 and 29, a shaft 30 having a threaded part 31 and a reduced plain part 32 in advance of the threaded part, a nut 33, the end of the threaded portion 31 of the shaft 30 being anchored against independent rotative movement but being permitted relative longitudinal movement as in the form first described. The sleeves 28 and 29 are also connected to the parts of the universal as in the form first described.

The sleeve 29 is formed with a partition 34 through which the reduced portion 32 of the shaft 30 has a sliding, non-leaking connection through an appropriate opening 35. The reduced portion 32 of the shaft 30 is provided on one side of the partition 34 with a piston 36 which, through the use of appropriate piston rings 37, has a sliding seal connection with the sleeve 29. A similar piston 38 sealed by piston rings 39 is secured upon the end of the reduced portion 32 of the shaft 30 on the opposite side of the partition 34.

If desired, the end of the reduced portion 32 of the shaft 30 receiving the piston 38 may be reduced and threaded to receive a permanent nut 40 for fixing the parts while at the same time providing for the convenient dismantling of such parts, when necessary.

That portion of the reduced part 32 of the shaft 30 intermediate the pistons 36 and 38 is provided with a by-pass 41 having terminal ports or outlets 42 and 43 at the respective ends which open through the surface of the shaft. The ports 42 and 43 are spaced an appropriate distance from the respective pistons 36 and 38, and the chambers 44 and 45 on the opposite sides of the partition 34 and between such partition and the pistons are filled with an appropriate fluid, as oil.

In this form, under the rotative action of the shaft 30 in one direction, the piston 36 will be caused to approach the partition 34. As long as the port 42 is open, the oil in chamber 44, displaced by the movement of the piston, will flow through the port 42, by-pass 41 and out the port 43 into the chamber 45. As the shaft 30 continues to advance, the port 42 will eventually be closed by the wall of the opening 35 in the partition 34; hence any further movement of the piston acts compressively against a confined body of oil. This will obviously lock the sleeves 28 and 29 together to transmit the movement and, of course, this transmission of movement will be somewhat gradual to avoid torque stress between the parts. The same operation occurs in the movement of the shaft in the opposite direction due, for example, to the over-running of sleeve 29 except, of course, that in this instance the compressive resistance to independent movement of the oil will take place in the chamber 45 and between the piston 38 and the partition 34.

In connection with the form first described, it is to be noted that the spring 26 is designed as the torque shock absorber in the driving of the vehicle in a forward direction, which, of course, is the main driving action in the ordinary use of the vehicle. In order to compensate for any loss of resistance in the spring 26 due to its almost constant use, the plug 24 is utilized as a means for adjusting the tension of the spring. This adjustment may compensate for tension wear in the spring but will be found to be of more utility in adjusting the spring in accordance with the load of the vehicle. Thus, by use of any appropriate tool engaging the projection 25, which tool may be readily applied through the universal 7, the plug 24 may be turned and adjusted longitudinally of the sleeve 2 to vary the spring resistance in accordance with conditions of load and spring tension.

While the improved torque shock absorber is designed more particularly for motor vehicles, it is quite apparent that it may be used with equal effectiveness where a driving connection is designed between a power element and a driven element.

What is claimed to be new is:

1. A drive shaft designed as a torque shock absorber, including a sleeve connected to the driving end, a second sleeve fitting within the first sleeve and connected to the driven end, a shaft in the sleeves, means for imparting rotary movement to the shaft from the driving sleeve, with said means permitting relative longitudinal movement of the shaft, a nut carried by the driven sleeve and cooperating with a thread-like channel in the shaft, a plunger at the free end of the shaft within the driven sleeve, a spring interposed between the plunger and one end of the driven sleeve, and a spring interposed between the plunger and said nut.

2. A drive shaft constructed to provide a torque shock absorber, including a driving sleeve, a driven sleeve fitted therein, a shaft extending longitudinally of the driving sleeve and within the driven sleeve, means carried by the driving sleeve to compel rotary movement while permitting independent longitudinal movement of the shaft, a nut carried by the driven sleeve and having threaded cooperation with a thread-like channel in the shaft, a plunger on that end of the shaft within the driven sleeve, and springs arranged on opposite sides of the plunger within the driven sleeve.

3. A drive shaft constructed to provide a torque shock absorber, including a driving sleeve, a driven sleeve fitted therein, a solid shaft extending longitudinally of the driving sleeve and within the driven sleeve, means carried by the driving sleeve to compel rotary movement while permitting independent longitudinal movement of the solid shaft, a nut carried by the driven sleeve and having threaded cooperation with a thread-like channel in the shaft, a plunger on that end of the shaft within the driven sleeve, springs arranged on opposite sides of the plunger within the driven sleeve, and means whereby the tension of one of the springs may be adjusted.

4. A drive shaft constructed to provide a torque shock absorber, including a driving sleeve, a driven sleeve fitted therein, a shaft extending longitudinally of the driving sleeve and within the driven sleeve, means carried by the driving sleeve to compel rotary movement while permtting independent longitudinal movement of the shaft, a nut carried by the driven sleeve and having threaded cooperation with a thread-like channel in the shaft, a plunger on that end of the shaft within the driven sleeve, springs arranged on opposite sides of the plunger within the driven sleeve, and a manually operable plug threaded in one end of the driven sleeve and forming an abutment for one of the springs, whereby the plug may be adjusted to vary the tension of the spring.

5. A drive shaft for automobiles including a driving sleeve, a driven sleeve fitted within one end of the driving sleeve, a driving member secured within one end of the driving sleeve, a shaft within the sleeves and having a broach-and-spline connection with the driving member, a nut carried by that end of the driven sleeve within the driving sleeve, the shaft being formed with an elongated thread-like channel cooperating with the nut, a plunger on the end of the shaft within the driven sleeve, and means whereby longitudinal movement of the shaft in either direction in the driven sleeve will gradually interlock said solid shaft and driven sleeve to transfer motion from the shaft to the driven sleeve.

6. A drive shaft designed as a torque shock absorber, including a sleeve connected to the driving end, a second sleeve fitting within the first sleeve and connected to the driven end, a shaft in the sleeves, means for imparting rotary movement to the shaft from the driving sleeve, with said means permitting longitudinal movement of the shaft relative to the sleeve, a nut carried by the driven sleeve and cooperating with a thread-like channel in the shaft, a fixed element in the driven sleeve, a piston carried by the shaft, and a medium interposed between the fixed element and piston acting under movement of the piston toward such fixed element to exert a gradually increasing compressive influence on the plunger and element sufficient to overcome the resistance of the second sleeve to rotative movement.

JAMES N. ICE. [L. S.]